(12) United States Patent
Doss et al.

(10) Patent No.: US 7,284,002 B2
(45) Date of Patent: Oct. 16, 2007

(54) CALENDAR-ENHANCED AWARENESS FOR INSTANT MESSAGING SYSTEMS AND ELECTRONIC STATUS BOARDS

(75) Inventors: J. Smith Doss, Raleigh, NC (US); Paul W. Haverstock, Acton, MA (US); Renee M. Kovales, Cary, NC (US); Diane P. Pozefsky, Chapel Hill, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/738,560

(22) Filed: Dec. 17, 2003

(65) Prior Publication Data

US 2004/0133638 A1    Jul. 8, 2004

Related U.S. Application Data

(62) Division of application No. 09/941,045, filed on Aug. 28, 2001, now Pat. No. 7,035,865.

(51) Int. Cl.
G06F 17/30 (2006.01)

(52) U.S. Cl. ............... 707/10; 707/104.1; 707/102; 707/3; 707/1; 709/205; 709/204; 715/751

(58) Field of Classification Search ............ 707/1, 707/2, 3, 10, 104.1; 709/204, 205
See application file for complete search history.

(56) References Cited

U.S. PATENT DOCUMENTS 6,640,230 B1 * 10/2003 Alexander et al. ............ 707/10
6,791,583 B2 * 9/2004 Tang et al. ................. 715/751
6,807,423 B1 * 10/2004 Armstrong et al. ......... 455/440
6,853,634 B1 * 2/2005 Davies et al. ............... 370/349
6,968,052 B2 * 11/2005 Wullert, II ............. 379/210.01
7,010,303 B2 * 3/2006 Lewis et al. ................ 455/445
7,149,716 B2 * 12/2006 Gatto ....................... 705/36 R
2002/0097856 A1 * 7/2002 Wullert, II ............. 379/201.01
2002/0116336 A1 * 8/2002 Diacakis et al. .............. 705/51
2004/0153509 A1 * 8/2004 Alcorn et al. ............... 709/205

OTHER PUBLICATIONS

Damain et al., "Awareness meets requirements management: awareness needs in global software development".*

Tang et al., "ConNextus to awarenex: extending awareness to mobile users", ACM, Mar. 31-Apr. 4, 2001.*

Isaacs et al., "Mobile instant messaging through Hubbub", ACM, vol. 45, No. 9, 2002.*

(Continued)

*Primary Examiner*—Jean M. Corrielus
(74) *Attorney, Agent, or Firm*—Stevens & Showalter LLP

(57) ABSTRACT

A method, system, and product are disclosed for providing calendar-enhanced awareness/presence information for instant messaging systems and electronic status boards. This invention automates status transitions, enhances and automates status messages, and automates and extends the IM "who can see me" function. Additionally, this invention extends awareness to dimensions other than IM status, to include availability in-person, via telephone, via wireless device or wireless messaging device (e.g., pager).

15 Claims, 12 Drawing Sheets

OTHER PUBLICATIONS

Regan et al., "Media center buddies: Instant messaging around a media center", ACM, Oct. 23-27, 2003.*

Tchiwarehouse.com, "instant messaging", May 12, 2003.*

Liscano et al., "A System for the seamless integration of personal messages using agents developed on a lotus notes platform", IBM, Press , 1996.*

Isaacs et al., "Hubbub: A sound enhanced mobile instant messenger that supports awareness and opportunistic interactions", Apr. 20-25, 2002.*

Damain et al., "Awareness meets requirements management: awareness needs in global software development", Proceedings of the ICSE International Workshop, 2003.*

* cited by examiner

| Name | Status / Location | Availability / Time | Alternate Contact | Best Means to Contact |
|---|---|---|---|---|
| Joe Adams | Out / Tahiti | 4/29/01 7:00 AM | Bob (D303) | NA |
| Sally Reide | In and Busy / Rm 407 | 2/11/01 2:00 PM | NA | Instant Msg Sally_Reide |
| Will Worthfield | At Work Location | 2/13/01 7:45 PM | Anne (x7-5309) | Cellphone 1-444-555-8765 |
| James Zelder | In / Rm 222 | | | Pager JZelder@Pager.com.net |

Figure 12

CALENDAR-ENHANCED AWARENESS FOR INSTANT MESSAGING SYSTEMS AND ELECTRONIC STATUS BOARDS

The present invention is a divisional of commonly assigned U.S. Pat. No. 7,035,865 (Ser. No. 09/941,045), filed on Aug. 28, 2001, which is entitled "Calendar-Enhanced Awareness for Instant Messaging Systems and Electronic Status Boards" and is incorporated herein by reference.

CROSS-REFERENCE TO RELATED APPLICATIONS

The present invention is related to the subject matter of co-pending patent application Ser. No. 09/670,844 entitled "CALENDAR EVENTS AND CALENDAR-DRIVEN APPLICATION TECHNIQUE", filed on Sep. 27, 2000, and co-pending patent application Ser. No. 09/671,001 entitled "CALENDAR-DRIVEN APPLICATION TECHNIQUE FOR PREPARING RESPONSES TO INCOMING EVENTS" filed on Sep. 27, 2001, both assigned to the assignee herein and incorporated herein by reference.

FIELD OF THE INVENTION

The present invention relates to a computer system, and more particularly to a method, system, and product that uses a person's calendar and a set of preferences to improve and extend instant messaging awareness and electronic status board information with calendar-enhanced awareness/presence and contact information.

BACKGROUND OF THE INVENTION

Calendars, and electronic calendars in particular, often contain a wealth of information about their owner. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth. Examples of electronic calendaring systems include Microsoft Outlook™ 2000, Lotus Organizer™, and Lotus Notes™. Such systems are quite popular among users. "Outlook" is a trademark of Microsoft Corporation. Lotus Organizer and Lotus Notes are trademarks of Lotus Development Corporation.

Use of electronic calendaring systems for purposes such as scheduling meetings of multiple persons is known in the art. For example, an invitation list may be created for a particular meeting, and a calendaring software application may then use this list to check each invitee's calendar for available time periods. A meeting may then be scheduled during a time period in which all, or some majority, of the invitees has sufficient time available on their calendar. However, it is desirable to more fully exploit the information stored in the calendaring system.

An automated system is described in the Applicants' related patent applications whereby electronic calendar-based engines are used to drive other software applications and agents, such as software agents that respond to e-mail and telephone calls by providing automated responses regarding the recipient's current availability. The automated system maintains a database of dynamically updated contact information for a plurality of people. The automated system accesses the dynamic contact database in order to determine a recipient's current availability. For example, the automated system may determine, utilizing the dynamic contact database, when the person is out of the office and could automatically generate the appropriate responses to incoming e-mails, telephone calls, etc., during the duration that the person is out of the office.

The automated system obtains information about a person's status, such as "in the office", "out of the office", "outside working hours", etc., from the individual's calendar. The automated system then combines this status information with preferences specified by this person that describe how the person could be contacted most immediately, an alternate contact, the frequency with which the person accesses voice mail and/or e-mail, and other information. The combined information obtained from the calendar and the preferences information are either stored in the dynamic contact database or derived real-time.

Users often communicate with one another using an instant messaging (IM) service. Instant messaging services permit a user to transmit an electronic message via a network, such as the Internet, to another user. Typically, users maintain a listing of people frequently contacted via the instant message service. This listing is displayed on their IM client and is often referred to as a "buddy list".

The buddy list has function in addition to maintaining a list of frequently contacted users; it is also used to provide information about the users. The buddy list can indicate a user's IM status (e.g., "active"), display user-provided messages (e.g., "I'm in a meeting"), and display system-provided messages (e.g., the amount of time a user is online). A user's IM status may be represented by a particular icon, text color or font. An active user may have a green icon next to his name whereas an offline user may have a gray icon. Typical IM status settings are: "active, "away", "do not disturb", "mobile", and "offline". A user can select a particular IM status. For example, the user may select "do not disturb" while he is using his computer for a customer presentation, and then select "active" when the presentation is completed. Alternately, the IM system may use techniques such as detecting keyboard and mouse activity to determine if the user is active. If activity is not detected for some predetermined amount of time the system could automatically set the user to "away".

The user-provided message can contain additional information about the particular user. This message may be user-customized, or selected from a list provided by the system. The message can be typed each time the user sets his status, or a unique message can be associated with a particular status. From the buddy list, one can view a user's message in various ways. For example, the message may be displayed next to the user's ID when the cursor is moved to hover over the ID.

While the buddy list information is somewhat helpful, its accuracy and content are limited. The user's status is set manually by the user, or automatically based on limited data. Additionally, the status is an indication of only the user's IM status —not his in-person availability, phone availability, or status via any other communications means. The user-provided message is also limited in that it typically contains only minimal or generic information (e.g., "I'm busy right now"). It would be advantageous to include more detailed information in the message such as the user's return date and time, and how the person might best be contacted at this time. Providing this level of detail manually would require additional user maintenance and the information would easily become outdated.

A similar set of problems is found with status boards. A status board can be a physical board or an online tool that is used by a group of users to indicate status information. The status information typically includes a person's in-person status (e.g., "out of the office"), destination, return date and time, and backup person. The physical status board is usually a centrally-located whiteboard that users update with their current status information by using a dry-erase marker. The online version allows the users to update their status from a computer or other electronic device.

Status boards are limited in that they typically require a person to manually update his status. The physical status board is additionally limited in that it can only be updated by someone physically at that location. As with the information provided by the IM system, status board information usually provides only a narrow view of a person's availability; it does not typically include a person's availability via office phone, cell phone, pager, and so forth. Additionally, the physical status board is restricted by the amount of space allocated for each person.

Therefore, a need exists for a method, system, and product that provide dynamically-updated enhanced contact information for instant messaging systems and electronic status boards.

SUMMARY OF THE INVENTION

A method, system, and product are disclosed for providing dynamic contact information to instant messaging (IM) systems and electronic status boards. This invention automates the changing of an entity's status on IM systems and electronic status boards, and also dynamically provides additional information that is not currently available with these systems.

An electronic calendar is maintained that includes information about an entity (e.g., a person, airplane, etc.). As the information in the calendar changes, the information provided to the IM systems and electronic status boards is automatically updated. Thus, when an entity's status changes, such as from being in the office and free to being in a meeting, the dynamic contact information will be automatically updated.

The dynamic contact information is composed of an entity's status and contact information. An entity's status can have several aspects: available in person, available via cell phone, available via pager, and so forth. Contact information is comprised of the information related to an entity's status, the preferences they've selected and information from the organizational directory. Examples of contact information include: the designated backup person, the best means to contact this entity, the entity's cell phone number, how long the entity will be available for calls on this number, and so on.

The dynamic contact information is derived from the entity's calendar, preferences, and organizational directory. The raw data is analyzed to identify time periods in which the entity has common status and contact information. At the start of each time period the dynamic contact information associated with that time period is provided to the IM servers and the status board servers. The IM servers and status board servers (which will henceforth be referred to as status servers) will then publish this information to their subscribers/clients.

This invention also identifies a means for displaying the dynamic contact information on the client. For each name in the buddy list, the client may display icons next to the name for the various types of status. For example, a telephone icon may be used to show an entity's availability via telephone, and a person icon may represent the entity's in-person status. The color of the icons could be used to indicate the status. Green could signify available, gray unavailable, and so on. To retrieve more detailed information the user could move the cursor over (i.e., hover over) a particular icon or name. The information pertinent to that icon or name would then be displayed. For example, by hovering over the telephone icon information such as the phone number, type of phone (e.g., cell, office), and telephone availability information may be displayed. By hovering over an entity's name, the user may view all of the available dynamic contact information for the entity. Additional information such as alternate contact people, and any other information that might be obtained from an entity's calendar, preferences or organizational directory may be provided.

Another aspect of this invention provides for the display of the dynamic contact information on a physical device other than a typical computer display. This physical device could be a television monitor (such as those used at airports to display flight information), or a digital display. By providing this feature, organizations with few computers could provide the dynamic contact information to a larger audience.

The present invention permits a user to specify various preferences that define the amount and types of data displayed by the client. For example, the user may wish to view all data or possibly only data pertaining to in-person availability. The user may also choose to display only those entities that are currently available in person. The client could accommodate this by displaying only the appropriate fields of the dynamic contact information and entities that meet the specified display preferences.

The present invention also permits an entity to specify various preferences that define the amount of information to be provided by the system to users. An entity can control whether or not information will be displayed to all users, to only a subset of users, or to all users except an explicitly defined set of specified users. Additionally, the entity can define the specific information that can be displayed. Combining these features allows an entity to identify which users can see which data fields. For example, an entity can specify that his cell phone information is not available to anyone, but his pager information is available to everyone. This feature enhances the current IM "who can see me" function by providing additional controls and automating the process. For example, an entity can specify that while in a meeting only people on the invitee list can see his IM presence. At the start time of the meeting the system automatically updates the entity's information; the invitees' IM clients indicate that the user is online while all other IM clients show that the user is not.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 12 depicts an electronic status board in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in any computer system platform, such as an IBM personal computer running the Microsoft Windows operating system or a Sun Microsystems workstation running operating systems such as UNIX or LINUX or a router system from Cisco or Juniper, without departing from the spirit and scope of the invention.

The servers in the present invention can run on multiple platforms. The clients can also run on different platforms from PCs, handheld devices such as palm devices and smart cell phones (e.g., WAP-enabled phones). The status board could be implemented using a very dumb display, such as a mechanical display used at some airports and train stations or on a well-known computing platform.

In the description of this embodiment, the term "people" is sometimes used instead of "entities". This is done for ease of discussion, and not intended to limit the scope of the invention.

Figure 1:
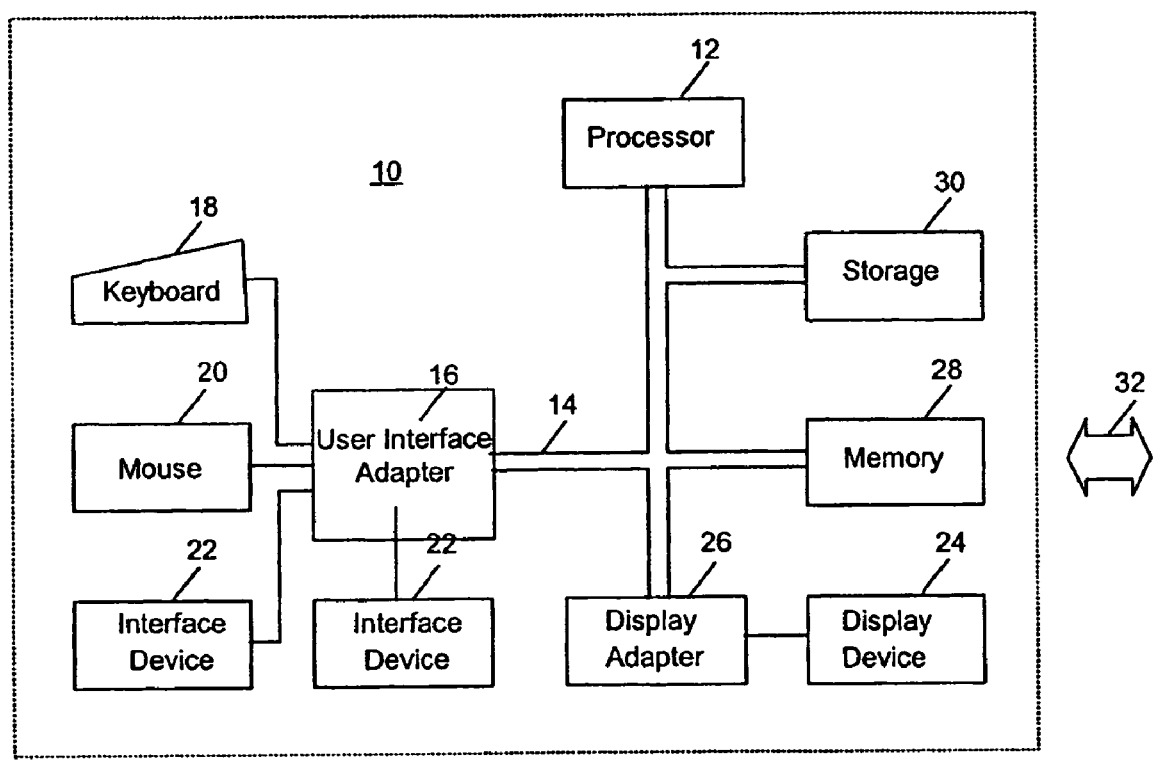
FIG. 1 illustrates a representative workstation hardware environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. Devices such as palms and smart cell phones (not shown) can be used instead of the simple workstation depicted by FIG. 1.

The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, or other type of storage device.

The workstation 10 may communicate with other computers or networks of computers, for example via a communications channel or modem 32. Alternatively, the workstation 10 may communicate using a wireless interface at 32, such as a CDPD cellular digital packet data (CDPD) card. The workstation 10 may be associated with such other computers in a local area network (LAN) or a wide area network (WAN).

Figure 2:
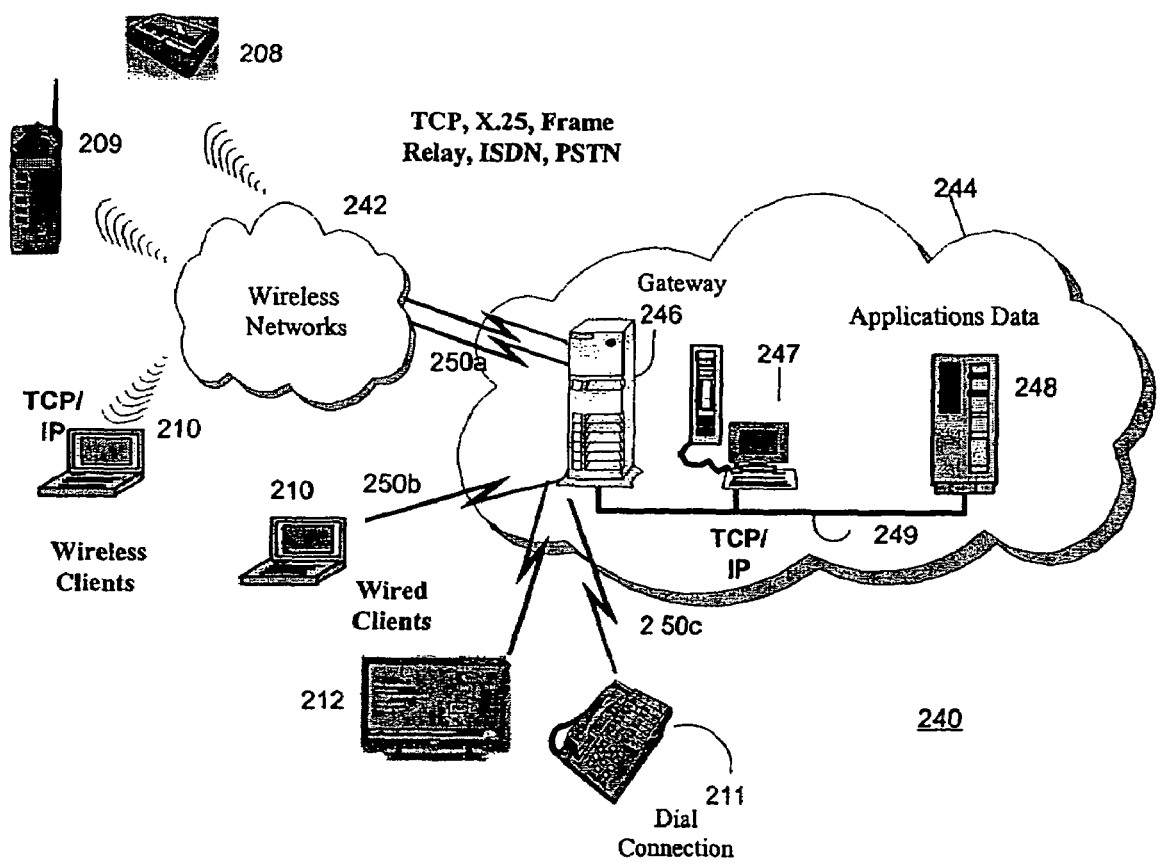
FIG. 2 illustrates a data processing network in which the present invention may be practiced.

FIG. 2 illustrates a data processing network 240 in which the present invention may be practiced. The data processing network 240 may include a plurality of individual networks, such as wireless network 242 and network 244, each of which may include a plurality of individual workstations 210 and other devices such as pagers 208 and cellular phones 209. Additionally, as those skilled in the art will appreciate, one or more LANs may be included (not shown), where a LAN may comprise a plurality of intelligent workstations and other devices, possibly coupled to a host processor.

Still referring to FIG. 2, the networks 242 and 244 may also include mainframe computers or servers, such as a gateway computer 246 or application server 247 (which may access a data repository 248). A gateway computer 246 serves as a point of entry into each network 244. The gateway 246 may be preferably coupled to another network 242 by means of a communications link 250a. The gateway 246 may also be directly coupled to one or more workstations 210 using a communications link 250b, or to other devices such as those shown at element 211 through a link 250c. The gateway computer 246 may be implemented utilizing an Enterprise Systems Architecture/370 available from the International Business Machines Corporation ("IBM"), an Enterprise Systems Architecture/390 computer, or other suitable computer system. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The gateway computer 246 may also be coupled 249 to a storage device, such as data repository 248. Further, the gateway 246 may be directly or indirectly coupled to one or more workstations 210 and other devices such as those shown at elements 208, 209, and 212.

Those skilled in the art will appreciate that the gateway computer 246 may be located a great geographic distance from the network 242, and similarly, the workstations 210 and other devices 208, 209, 211, 212 may be located a substantial distance from the networks 242 and 244. For example, the network 242 may be located in California, while the gateway 246 may be located in Texas, and one or more of the workstations 210 may be located in New York. The workstations 210 and other devices such as those shown at elements 208 and 209 may connect to the wireless network 242 using a networking protocol such as the Transmission Control Protocol/Internet Protocol ("TCP/IP"), AppleTalk@, a particular wireless networking protocol, such as the Wireless Application Protocol ("WAP"), the Global System for Mobile communications ("GSM"), or the Systems Network Architecture ("SNA") over a number of alternative connection media, such as cellular phone, radio frequency networks, or satellite networks. "AppleTalk" is a registered trademark of Apple Computer, Inc. The wireless network 242 preferably connects to the gateway 246 using a network connection 250a such as TCP or UDP (User Datagram Protocol) over IP, X. 25, Frame Relay, ISDN (Integrated Services Digital Network), or PSTN (Public Switched Telephone Network). The workstations 210 may alternatively connect directly to the gateway 246 using dial connections 250b or 250c. Further, the wireless network 242 and network 244 may connect to one or more other networks (not shown), in an analogous manner to that depicted in FIG. 2.

Software programming code that embodies the present invention is typically accessed by the microprocessor of the workstation, other devices such as those shown at 208 and 209, and/or server 247 from long-term storage media 30 (shown in FIG. 1) of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14 (shown in FIG. 1). Furthermore, networked storage, including storage area networks and network-attached storage, may also be used. The techniques and methods for embodying software programming code in memory, on physical media, and/or distributing software code via networks are well known and will not be further discussed herein.

A user of the present invention may connect his computing device to a server using a wired connection, or a wireless connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet to establish a connection over a local area network; using a cellular modem to establish a wireless connection. The user's computing device may be any type of computer processor, including laptop, handheld or mobile computers; smart phones with display; vehicle-mounted devices; desktop computers; or mainframe computers, having processing and communication capabilities. The features of the present invention may also be accessed by users who are not using computing devices, but instead are using devices such as a smart telephone 211 or an electronic status board 212. The remote server, similarly, can be one of any number of different types of computer that have processing and communication capabilities. These techniques are well known in the art, and the hardware devices and software that enable their use are readily available.

In the preferred embodiments, the present invention is implemented as one or more modules (also referred to as code subroutines, or "objects" in object-oriented programming) of a computer software program (or programs). The program code of the preferred embodiments may be implemented as objects in an object-oriented programming language, or in a conventional procedure oriented language, or in a mix of object-oriented and procedural language code.

Figure 3:
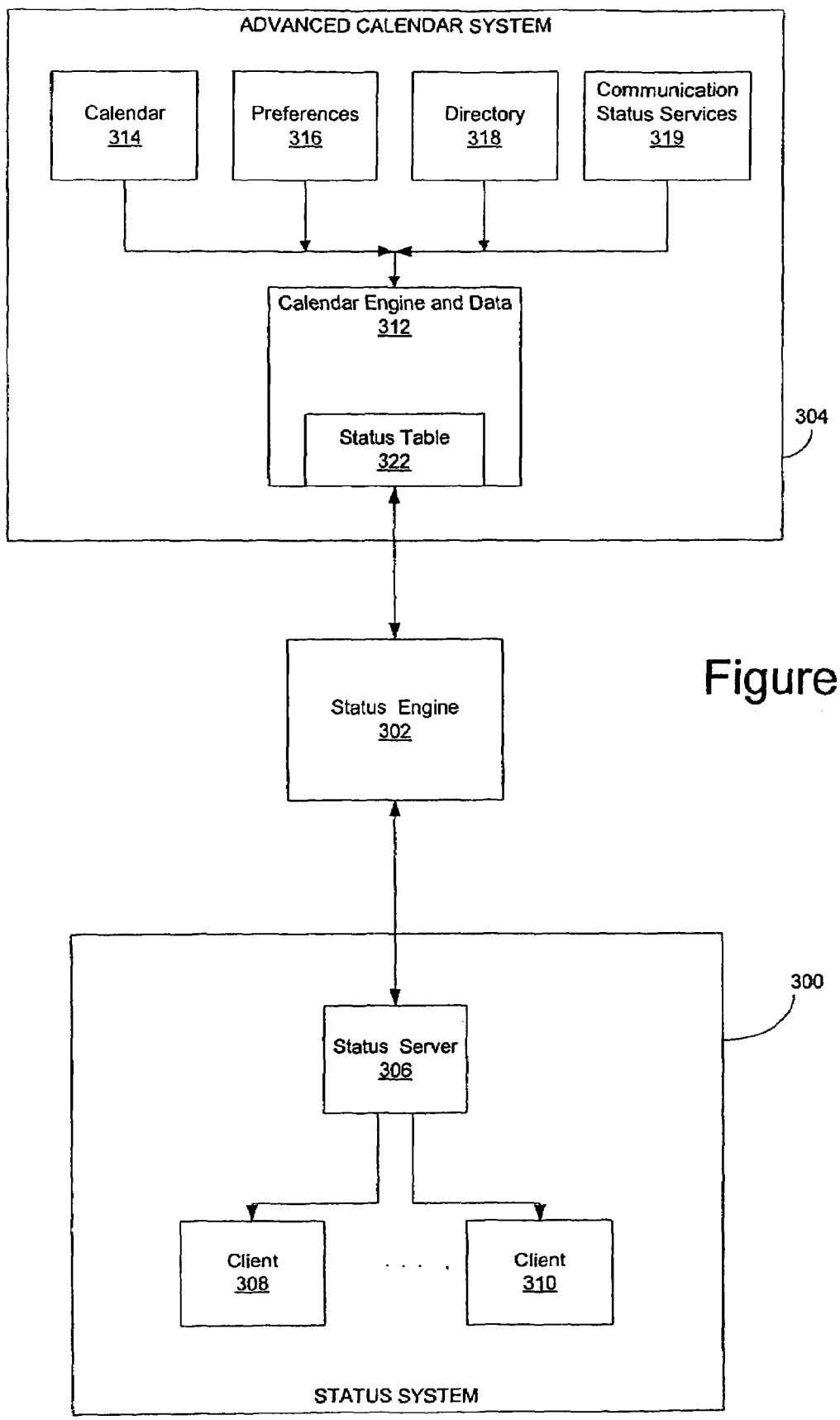
FIG. 3 is a block diagram that illustrates a status message system coupled to an advanced calendar system in accordance with the present invention.

FIG. 3 is a block diagram that illustrates a status system coupled to an advanced calendar system in accordance with the present invention. A status system 300 is coupled to a status engine 302, which is coupled to an advanced calendar system 304. Status system 300 includes a status server 306, which is coupled to multiple clients, such as clients 308 and 310.

The advanced calendar system 304 includes a calendar engine 312, a plurality of entities' electronic calendars 314, entities' preferences 316, an organization directory 318, and communication status services 319. The calendar engine 312, uses the data from entities' calendars 314 and preferences 316, from the organization directory 318, and from the communication status services to create the dynamic contact information. The dynamic contact information for each entity will contain data such as the entity's availability via cell phone, when the entity will next be available for a page, how frequently the entity checks voice mail, etc. This is then stored in the status table. The status table contains records of dynamic contact information for all entities. Typically, multiple records exist for each entity; each record designates a unique time period.

The communication status services 319, provides data indicating whether a communication means is in service and if it is currently available for communication. The device's service provider provides this information. The status engine 302, communicates with the advanced calendar system 304 to determine if the dynamic contact information has changed for any entity. If a change has occurred this information is sent to the status system 300. The status engine could also serve multiple status systems.

Figure 4:
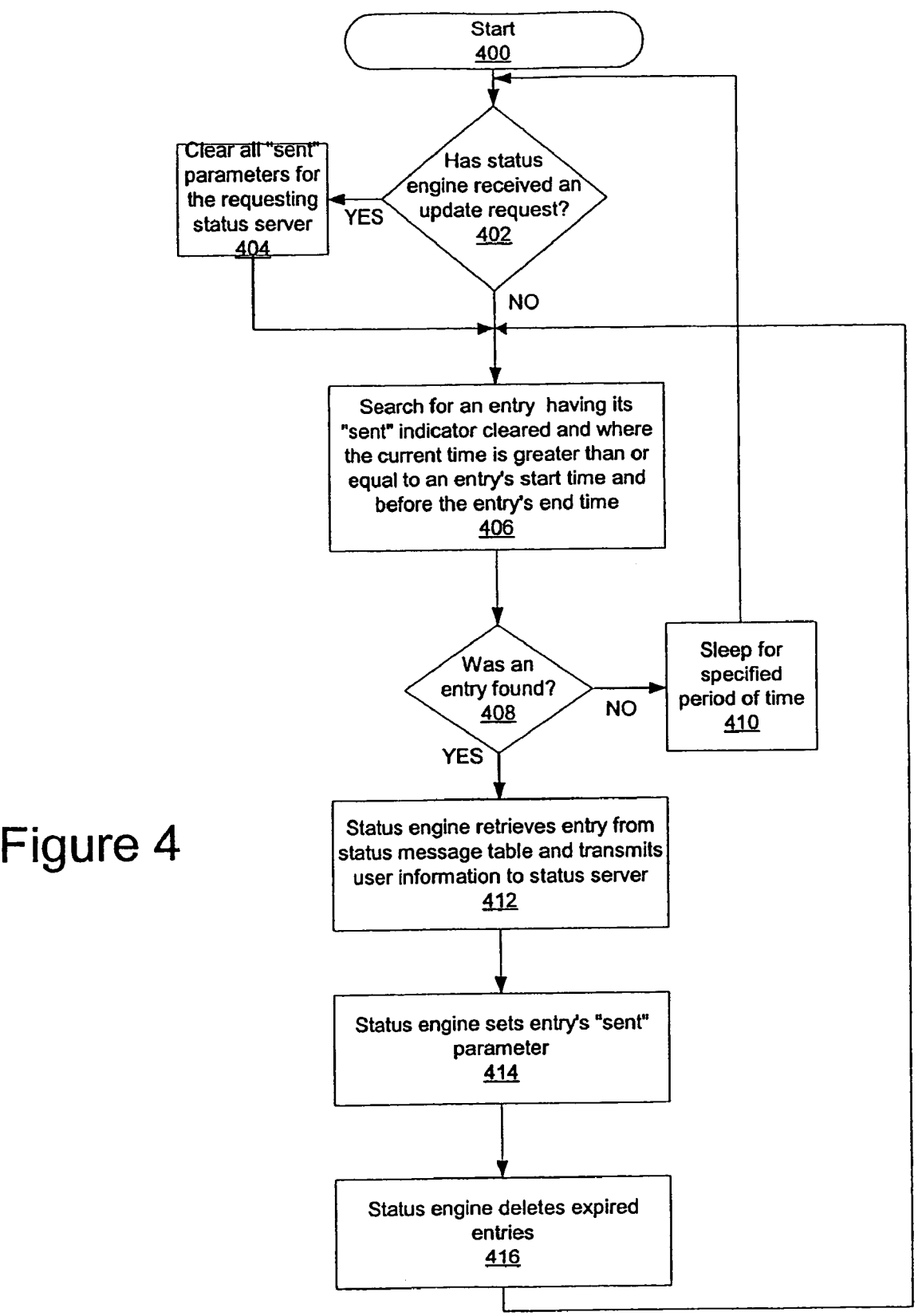
FIG. 4 is a high level flow chart that depicts the status engine processing requests and transmitting dynamic contact information in accordance with the present invention.

FIG. 4 is a high level flow chart that depicts the status engine processing requests and transmitting dynamic contact information to the status server. The process starts as depicted by block 400 and thereafter passes to block 402, which illustrates a determination of whether or not the status engine has received an update request from a status server. This update request will be an indication that the status server has lost all of its information and therefore is requesting an update for all people. If a determination is made that the status engine has received an update request, the process passes to block 404, which depicts the status engine clearing all "sent" indicators for each entry for the requesting status server to indicate that this dynamic contact information entry has not been sent to the status server. The process then passes to block 406. Referring again to block 402, if a determination is made that the status engine has not received an update request, the process passes to block 406, which illustrates the status engine searching the status table for an entry having its "sent" indicator cleared and where the current time is greater than or equal to an entry's start time and before the entry's end time. Next, block 408 depicts a determination of whether or not an entry was found that met the criteria described as depicted by block 406. If a determination is made that an entry was not found that met the criteria described as depicted by block 406, the process passes to block 410, which illustrates the status engine sleeping for a specified period of time. The process then passes back to block 402.

Referring again to block 408, if a determination is made that an entry was found that met the criteria described as depicted by block 406, the process passes to block 412, which illustrates the status engine retrieving the entry from the status table and then transmitting the person's dynamic contact information for this entry to the status server. For purposes of this discussion, the term "transmit" includes both the transmittal of data and the assurance that transmittal has succeeded. Such transmittal may include multiple communications between the status engine and the status server. Next, block 414 depicts the status engine setting the entry's "sent" indicator. Thereafter, block 416 illustrates the status engine deleting entries from the status table when the current date and time are greater than the entry's end date and time. The process then passes back to block 406.

Figure 5:
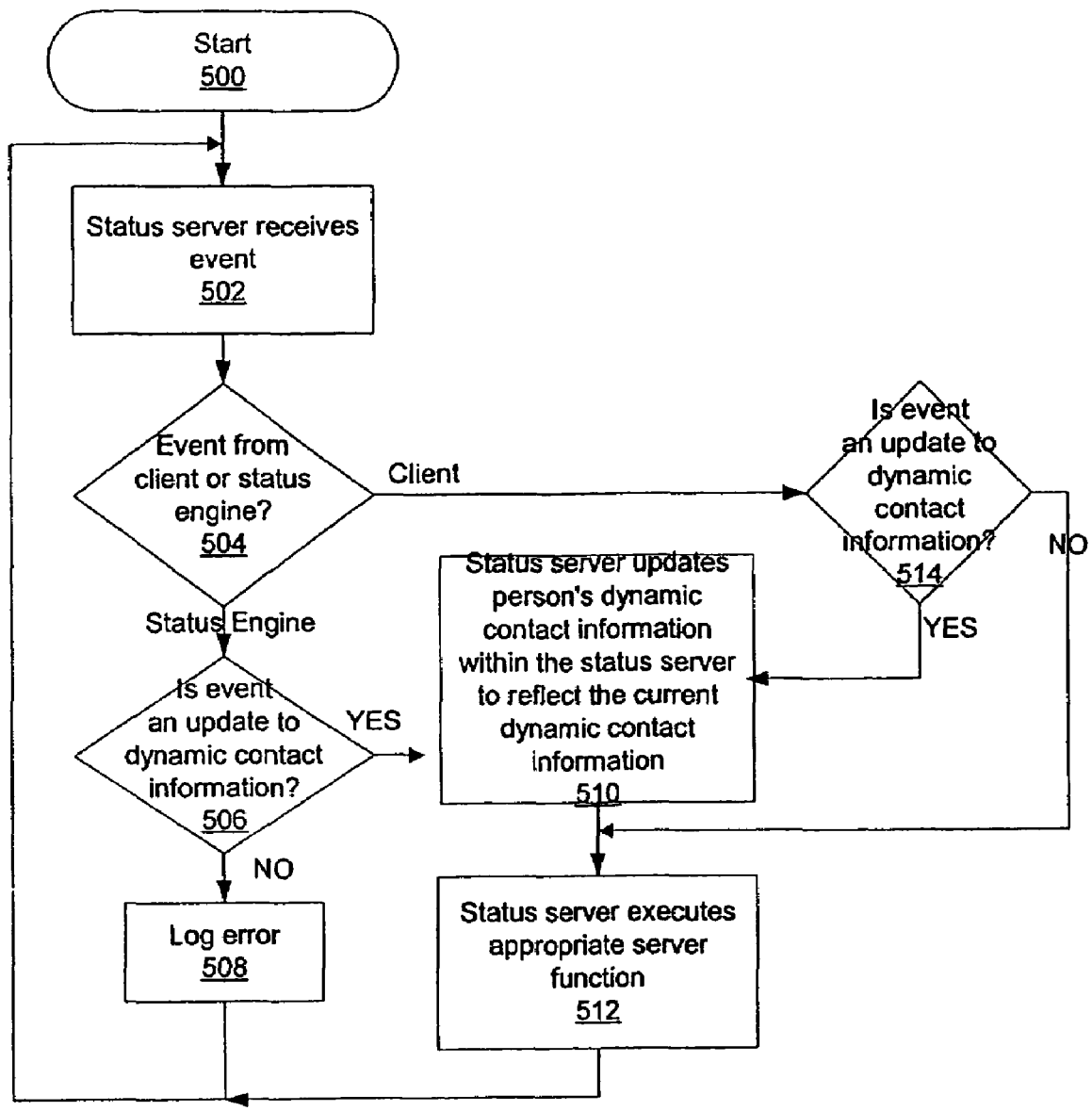
FIG. 5 is a high level flow chart that illustrates the status server receiving and processing events in accordance with the present invention.

FIG. 5 is a high level flow chart that illustrates the status server receiving and processing events in accordance with the present invention. The process starts as depicted by block 500 and thereafter passes to block 502, which illustrates the status server receiving an event. The process then passes to block 504, which depicts a determination of whether or not the event was received from the status engine or from a client. If a determination is made that the event was received from the status engine, the process passes to block 506, which illustrates a determination of whether or not the event is an event to update dynamic contact information. If a determination is made that the event is not an event to update dynamic contact information, the process passes to block 508, which depicts logging an error. The process then passes back to block 502.

Referring again to block 506, if a determination is made that the event is an event to update dynamic contact information, the process passes to block 510, which illustrates the status server updating the person's dynamic contact information within the status server to reflect the new data. The process then passes to block 512, which depicts the status server executing the appropriate server function. One example of an appropriate server function would be for the status server to transmit the person's new dynamic contact information to each client that has subscribed to this person's dynamic contact information. The process then passes back to block 502.

Referring again to block 504, if a determination is made that the event is from one of the clients, the process passes to block 514, which illustrates a determination of whether or not the event is an update of the dynamic contact information. If a determination is made that the event is not an update of the dynamic contact information, the process passes to block 512. Referring again to block 514, if a determination is made that the event is an event to update dynamic contact information, the process passes to block 510, which depicts the status server updating the person's dynamic contact information within the status server. The process then passes to block 512.

Figure 6:
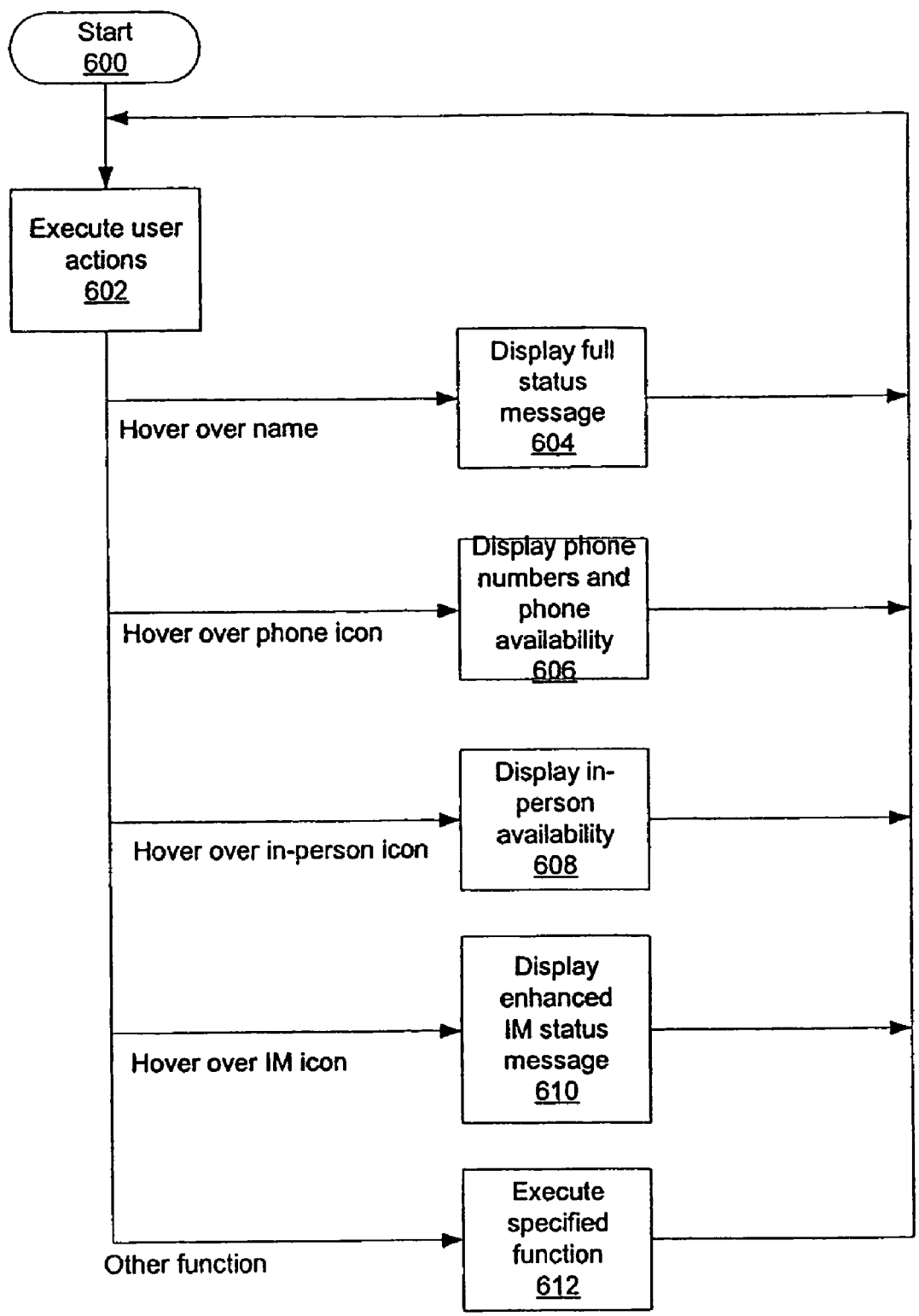
FIG. 6 is a high level flow chart that depicts the processing of various instant messenger client user actions in accordance with the present invention.
Figure 7:
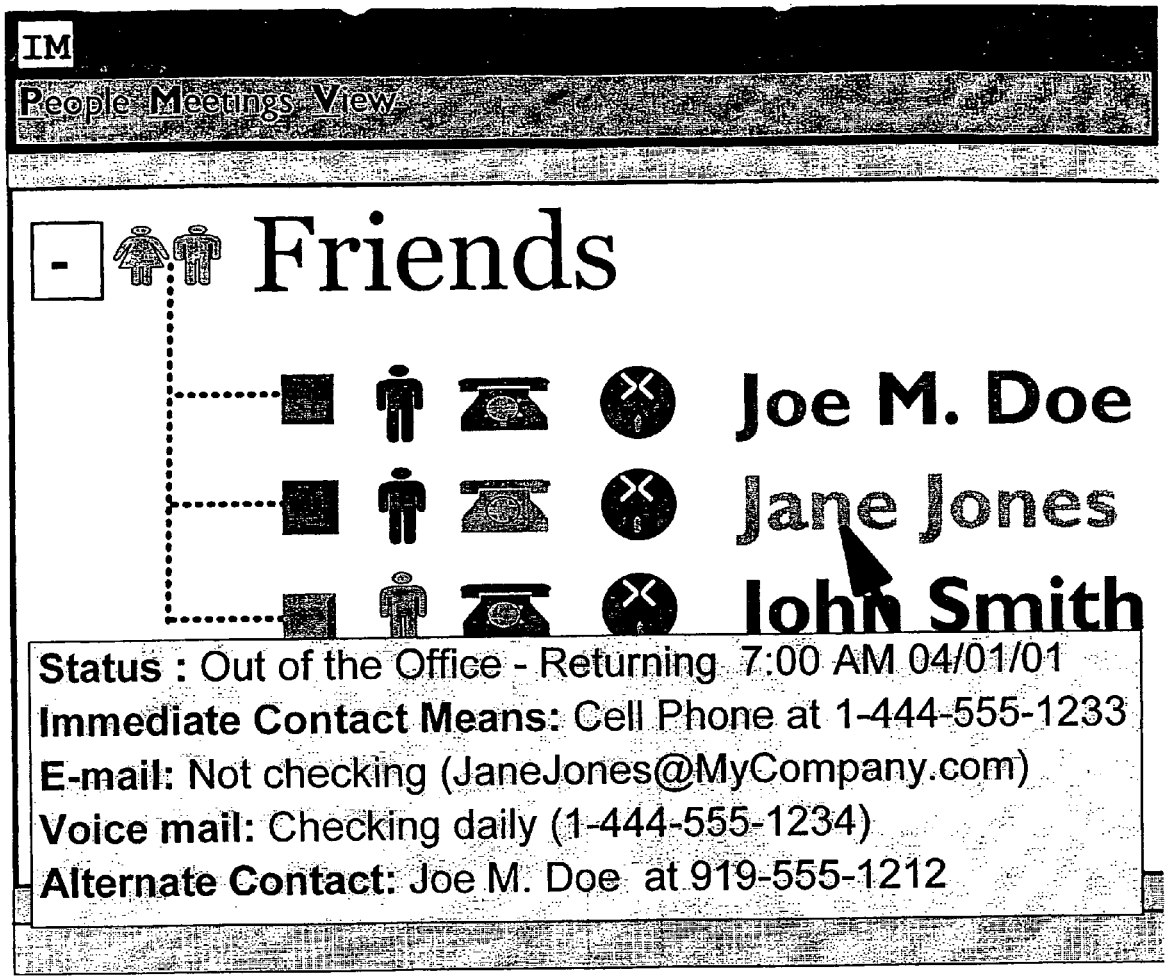
FIG. 7 depicts a computer display screen displaying a listing of entities and a message that is generated and displayed when a cursor hovers over an entity's name in accordance with the present invention.

FIG. 6 is a high level flow chart that depicts the processing of various user actions on an Instant Messaging client in accordance with the present invention. The process starts as illustrated by block 600 and thereafter passes to block 602, which depicts the execution of a user action. If the user has moved the cursor to and held it over the name of one of the people on the buddy list, the process passes to block 604, which illustrates displaying a full status message, such as the example depicted by FIG. 7, for the person. The process then passes back to block 602.

Figure 8:
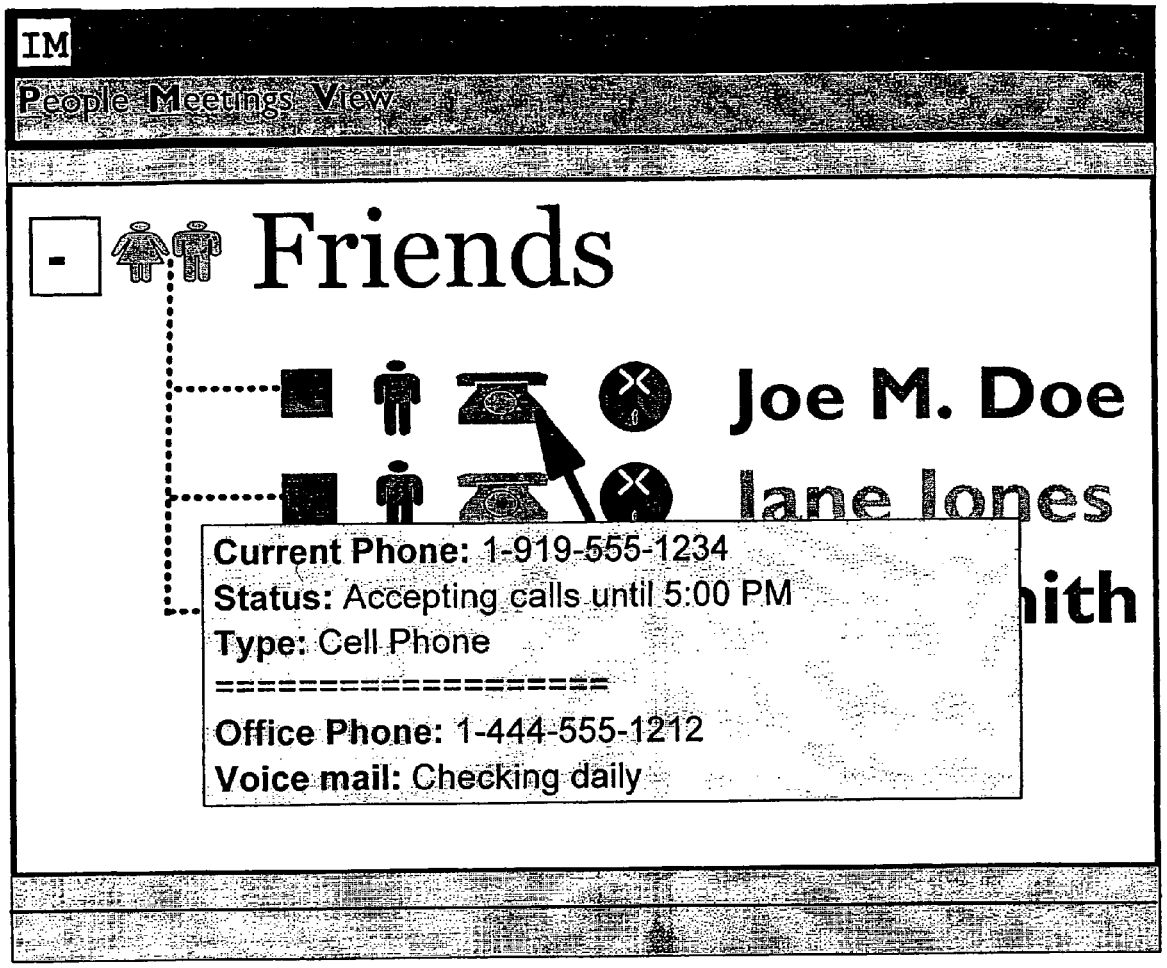
FIG. 8 depicts a computer display screen displaying a listing of entities and a message that is generated and displayed when a cursor hovers over a phone icon in accordance with the present invention.

Referring again to block 602, if the user has moved the cursor to and held it over the phone icon of one of the people, the process passes to block 606, which depicts displaying, as in the example illustrated by FIG. 8, phone numbers and phone availability for the person. The process then passes back to block 602.

Figure 9:
FIG. 9 depicts a computer display screen displaying a listing of entities and a message that is generated and displayed when a cursor hovers over an in-person icon in accordance with the present invention.

Referring again to block 602, if the user has moved the cursor to and held it over the in-person icon of one of the people, the process passes to block 608-, which illustrates displaying, as in the example depicted by FIG. 9, in-person availability for the person. The process then passes back to block 602.

Figure 10:
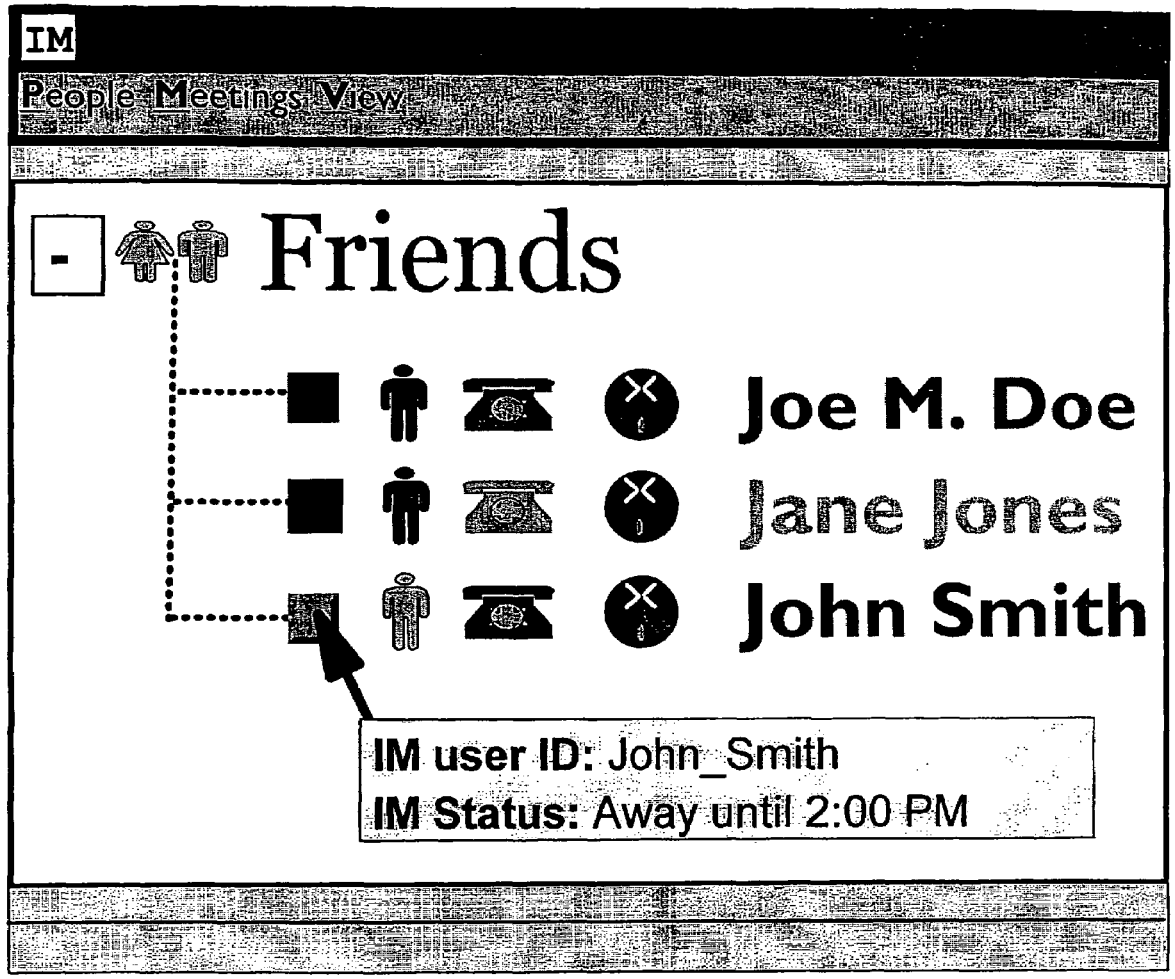
FIG. 10 depicts a computer display screen displaying a listing of entities and a message that is generated and displayed when a cursor hovers over an instant messaging icon in accordance with the present invention.

Referring again to block 602, if the user has moved the cursor to and held it over the icon representing the IM status of one of the people, the process passes to block 610, which depicts displaying, as in the example illustrated by FIG. 10, an enhanced IM status message for the person. The process then passes back to block 602.

And, referring again to block 602, if the user has moved the cursor to and held it over another function for one of the people or has selected a client menu option, the process passes to block 612, which illustrates executing the specified function. Examples of these functions include sending a message, adding a user, or changing states.

Figure 11:
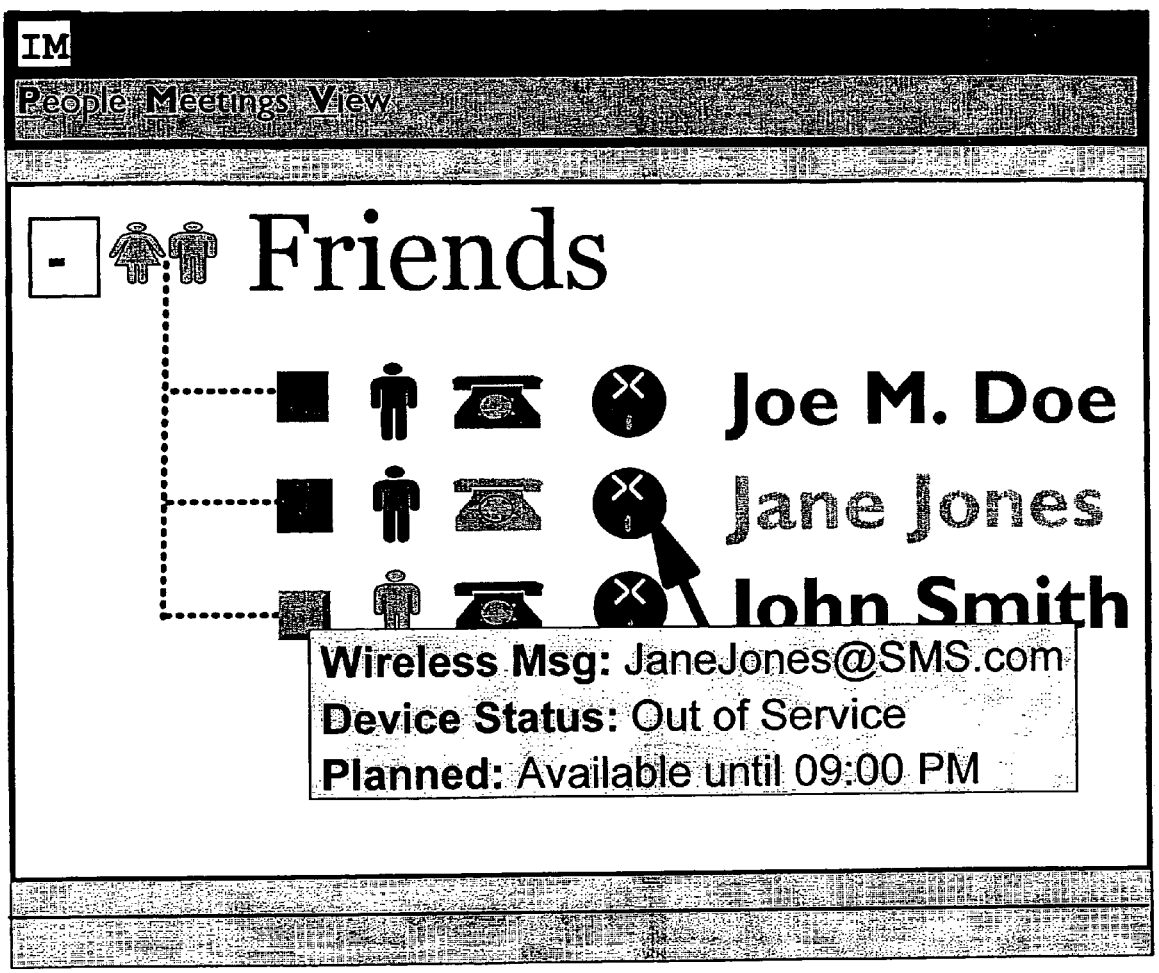
FIG. 11 depicts a computer display screen displaying a listing of entities and a message that is generated and displayed when a cursor hovers over a wireless icon in accordance with the present invention.

Another example is depicted by FIG. 11. If the user has moved the cursor to and held it over the icon representing the wireless status of one of the people, an enhanced wireless status message is displayed for the person. The process then passes back to block 602.

FIGS. 7 through 11 are examples of how a client may display the dynamic contact information for a set of entities in accordance with the present invention. Additional and/or alternate icons, text, color, formatting, and techniques may be used to convey this or alternate information to the user.

FIG. 12 depicts an example of an electronic status board in accordance with the present invention. This figure shows one example of how the dynamic contact information for a set of entities may be displayed. The displayed information can be tailored to the needs of those viewing the data. If on the physical display insufficient space is available, the display could refresh after a predetermined amount of time with additional information for the current set of entities, or information for a new set of entities. Note that FIG. 12 provides a very basic view of the data. Enhanced views, such as those shown in FIGS. 7 through 11, can be used for the electronic status board, but the capabilities of the physical status board device must be considered when creating the interface.

The electronic status board system observes the basic client-server model that is also used by instant messaging systems. The electronic status board has clients that can be physical displays or online applications. The physical display is a simple display device that is capable of displaying text and/or graphical information and includes, but is not limited to, a computer display or an LCD panel. Both the online and physical clients display the dynamic contact information based on user preferences. For the physical display, the preferences can be entered from an accompanying application used to drive the physical status board. For this invention, the functions described previously for an IM system apply to electronic status boards as well, except that the electronic status board clients are not capable of updating the status information.

The following is a simplified example of the present invention.

Suppose a person has specified the following default preferences:
Preferences for Free Time:
Instant Message who can see me=provided by IM client
Instant Message status=active
Office phone status=available
Cell phone status=available
Wireless Messaging status=available
Preferred means of contact=office phone
Preferences for In-person Meeting:
Instant Message who can see me=provided by IM client
Instant Message status=active
Office phone status=not available
Cell phone status=not available
Wireless Messaging status=available
Preferred means of contact=pager
The person's calendar has the following entries for today:
Entry 1: 10:00-11:00 In-person meeting
Subject=view charts online
Location=CR 202
IM status: do not disturb (DND)
Entry 2: 12:00-13:00 In-person meeting
subject=department meeting The calendar data, preferences and company directory have been analyzed by the calendar engine and the resulting dynamic contact information is available for use by the status engine.

When the current time is 10:00, the status engine determines that the status server needs an update for this person. The status engine will then send the dynamic contact information relating to entry 1 to the status server. The status server will propagate this information as required to the subscribing clients. At 11:00, the person's meeting has ended and the status server needs to be updated. The status engine sends the dynamic contact information relating to free time to the status server. Similarly at 12:00 and at 13:00 updates will be sent to the status server.

The dynamic contact information that is sent to the status server would contain the various status types (e.g., telephone status, IM status, and etc.) as well as the associated contact data (alternate contact person, pager number, etc.). For the previous example, at 10:00 the status engine would have sent to the status server that the person was not available via telephone until 11:00, was in "do-not-disturb" mode for IM until 11:00, but was available by page. Additional information such as the person's pager number 555-1112, backup person (sally@company123.com), and location (CR 202) would be provided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMS, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing dynamic contact information, the method comprising:
   identifying changes in dynamic contact information for a user;
   sending the changes to at least one of an instant messaging system server and an electronic status board server, said instant messaging system server for passing instant messages between a plurality of instant messaging system subscriber users and said electronic status board server for causing dynamic contact information for a plurality of electronic status board users to be displayed to a plurality of electronic status board subscriber users, wherein the changes are used by the instant messaging system server and the electronic status board server to change the dynamic contact information for the user; and
   specifying at least one preference for defining an amount of the dynamic contact information for the user that is displayed and whether or not the defined dynamic contact information amount is displayed to all or only a subset of the subscriber users of the instant messaging system and the electronic status board.

2. The method of claim 1, further comprises:
   sending the changes to the other of the instant messaging system server and the electronic status board server, wherein the changes are used by the other of the instant messaging system server and the electronic status board server to change dynamic contact information for the user and the change in the dynamic contact information for the user is accessible to subscriber users of the other of the instant messaging system and the electronic status board.

3. The method of claim 1, wherein the dynamic contact information comprises communications device status for the user.

4. The method of claim 1, wherein a preference is defined such that the dynamic contact information amount is display to all subscriber users of the instant messaging system and the electronic status board.

5. A data processing system comprising:
   an instant messaging system server or an electronic status board server to maintain dynamic contact information for an instant messaging system user or an electronic status board user in which the dynamic contact information is provided to a group of clients for instant messaging system subscriber users or electronic status board subscriber users, said instant messaging system server or electronic status board server to receive updated dynamic contact information from a client for the instant messaging system user or the electronic status board user and said instant messaging system server or electronic status board server to change the dynamic contact information for the user based on receiving the updated dynamic contact information, and said instant messaging system server or electronic status board server receiving at least one preference defining an amount of the dynamic contact information for the user that is displayed and whether or not the defined dynamic contact information amount is displayed to all or only a subset of the group of clients for instant messaging system subscriber users or electronic status board subscriber users.

6. The data processing system of claim 5, wherein said instant messaging system server or electronic status board server receives a preference defining that the dynamic contact information amount will be displayed to the entire group of clients for instant messaging system subscriber users or electronic status board subscriber users.

7. The data processing system of claim 5, wherein said instant messaging system server receives a preference from one instant messaging system subscriber user defining an amount of dynamic contact information from other subscriber users to be displayed by a client corresponding to the one subscriber user.

8. A data processing system comprising:
a module to identify changes in dynamic contact information for a user, a module to send the changes to at least one of an instant messaging system server and an electronic status board server, wherein said instant messaging system server passes instant messages between a plurality of instant messaging system subscriber users, and wherein said electronic status board server causes dynamic contact information for a plurality of electronic status board users to be displayed to a plurality of electronic status board subscriber users, and wherein the changes are used by the instant messaging system server and the electronic status board server to change the dynamic contact information for the user and a module to specify at least one preference for defining an amount of the dynamic contact information for the user that is displayed and whether or not the defined dynamic contact information amount is displayed to all or only a subset of the subscriber users of the instant messaging system and the electronic status board.

9. A data processing system for managing dynamic contact information, the data processing system comprising:
an instant messaging system server or an electronic status board server to maintain dynamic contact information for an instant messaging system user or an electronic status board user, wherein the dynamic contact information is capable of being provided to a group of clients for instant messaging system subscriber users or electronic status board subscriber users;
said instant messaging system server or electronic status board server to receive updated dynamic contact information from a client for the instant messaging system user or electronic status board user;
said instant messaging system server or electronic status board server, responsive to receiving the updated dynamic contact information, to change the dynamic contact information for the user based on receiving the updated dynamic contact information; and
said instant messaging system server or electronic status board server to receive at least one preference defining an amount of the dynamic contact information for the user that is displayed and whether or not the defined dynamic contact information amount is displayed to all or only a subset of the group of clients for instant messaging system subscriber users or electronic status board subscriber users.

10. The data processing system of claim 9, wherein the changed dynamic contact information comprises an identification of at least one of when the user is in an office, at an alternate work location, free, in a meeting, available via cell phone, and available via pager.

11. The data processing system of claim 9, wherein the client is at least one of a personal digital assistant, a phone, a laptop computer, and a personal computer.

12. The data processing system of claim 9, wherein the dynamic contact information comprises at least one of status information for the user derived from a calendar and contact information derived from the calendar.

13. A data processing system for providing dynamic contact information, the data processing system comprising:
a module to identify changes in dynamic contact information for a user;
a module to send the changes to at least one of an instant messaging system server and an electronic status board server, wherein said instant messaging system server passes instant messages between a plurality of instant messaging system subscriber users, and wherein said electronic status board server causes dynamic contact information for a plurality of electronic status board users to be displayed to a plurality of electronic status board subscriber users, and wherein the changes are used by the instant messaging system server and the electronic status board server to change the dynamic contact information for the user; and
a module to specify at least one preference for defining an amount of the dynamic contact information for the user that is displayed and whether or not the defined dynamic contact information amount is displayed to all or only a subset of the subscriber users of the instant messaging system and the electronic status board.

14. A computer program product comprising a computer readable medium comprising computer usable program code for managing dynamic contact information, the computer program product comprising:
computer usable program code for maintaining dynamic contact information for an instant messaging system user or an electronic status board user, wherein the dynamic contact information is provided to at least one of a group of clients for instant messaging system subscriber users or electronic status board subscriber users;
computer usable program code for receiving updated dynamic contact information from a client for the instant messaging system user or electronic status board user; and
computer usable program code, responsive to receiving the updated dynamic contact information, for changing the dynamic contact information for the user based on receiving the updated dynamic contact information; and
computer usable program code for receiving at least one preference defining an amount of the dynamic contact information for the user that is displayed and whether or not the defined dynamic contact information amount is displayed to all or only a subset of the group of clients for instant messaging system subscriber users or electronic status board subscriber users.

15. A computer program product comprising a computer readable medium comprising computer usable program code for providing dynamic contact information, the computer program product comprising:
computer usable program code for identifying changes in dynamic contact information for a user;
computer usable program code for sending the changes to at least one of an instant messaging system server and an electronic status board server, wherein said instant messaging system server passes instant messages between a plurality of instant messaging system subscriber users, and wherein said electronic status board server causes dynamic contact information for a plurality of electronic status board users to be displayed to a plurality of electronic status board subscriber users, wherein the changes are used by the instant messaging system server and the electronic status board server to change dynamic contact information for the user; and computer program code to specify at least one preference for defining an amount of the dynamic contact information for the user that is displayed and whether or not the defined dynamic contact information amount is displayed to all or only a subset of the subscriber users of the instant messaging system and the electronic status board.

* * * * *